(12) United States Patent
Ogura

(10) Patent No.: US 12,429,689 B2
(45) Date of Patent: Sep. 30, 2025

(54) HEAD-UP DISPLAY

(71) Applicant: Panasonic Intellectual Property Management Co., Ltd., Osaka (JP)

(72) Inventor: Tetsuya Ogura, Kanagawa (JP)

(73) Assignee: PANASONIC AUTOMOTIVE SYSTEMS CO., LTD, Kanagawa (JP)

( * ) Notice: Subject to any disclaimer, the term of this patent is extended or adjusted under 35 U.S.C. 154(b) by 416 days.

(21) Appl. No.: 17/964,481

(22) Filed: Oct. 12, 2022

(65) Prior Publication Data

US 2023/0120396 A1 Apr. 20, 2023

(30) Foreign Application Priority Data

Oct. 18, 2021 (JP) ................................. 2021-170418

(51) Int. Cl.
*G02B 27/01* (2006.01)
*G02B 7/182* (2021.01)

(52) U.S. Cl.
CPC ....... *G02B 27/0101* (2013.01); *G02B 7/1821* (2013.01)

(58) Field of Classification Search
CPC ... G02B 27/01–0189; G02B 2027/0105–0198; G02B 7/00–40
See application file for complete search history.

(56) References Cited

U.S. PATENT DOCUMENTS

| 2011/0061482 A1* | 3/2011 | Maruyama | ......... F16H 25/2015 74/89.23 |
| 2017/0168300 A1 | 6/2017 | Ohkawa et al. | |
| 2017/0371158 A1 | 12/2017 | Tang-Kong | |
| 2019/0285889 A1* | 9/2019 | Ogura | ................ G02B 19/0009 |
| 2020/0241297 A1* | 7/2020 | Hatasako | ............... B60K 35/53 |
| 2020/0363637 A1 | 11/2020 | Uto et al. | |

FOREIGN PATENT DOCUMENTS

| DE | 10 2019 106 744 A1 | 9/2019 |
| JP | 2001-191817 A | 7/2001 |
| JP | 2017-105323 A | 6/2017 |

(Continued)

OTHER PUBLICATIONS

Office Action mailed on Mar. 14, 2023, for the corresponding German patent application No. 102022126784.9 with English translation thereof.

(Continued)

*Primary Examiner* — Christopher A Lamb, II
(74) *Attorney, Agent, or Firm* — GREENBLUM & BERNSTEIN, P.L.C.

(57) ABSTRACT

A head-up display includes a mirror body, a mirror having a shaft serving a rotary axis, a bearing member which holds the shaft of the mirror to be rotatable, a torsion spring through which the shaft penetrates and which urges the mirror in a predetermined rotational direction of the rotary axis with respect to the bearing member, and a housing which accommodates the mirror, the bearing member, and the torsion spring. The torsion spring is disposed on an opposite side opposite to the mirror with respect to the bearing member. The bearing member includes a protrusion to which one end of the torsion spring is hung. The housing includes a depressed portion fitted to the bearing member to fix the bearing member.

13 Claims, 10 Drawing Sheets

(56) References Cited

FOREIGN PATENT DOCUMENTS

| | | |
|---|---|---|
| JP | 2019-078966 A | 5/2019 |
| JP | 2019-139127 A | 8/2019 |
| JP | 2019-189011 A | 10/2019 |
| WO | WO2018/079308 A1 | 5/2018 |
| WO | WO2019/044322 A1 | 3/2019 |
| WO | WO2020/027319 A1 | 2/2020 |

OTHER PUBLICATIONS

Notice of Reasons for Refusal dated May 13, 2025, in family member Japanese patent application No. 2021-170418 along with English translation.

* cited by examiner

HEAD-UP DISPLAY

CROSS REFERENCE TO RELATED APPLICATION

The present application is based on and claims priority of Japanese Patent Application No. 2021-170418 filed on Oct. 18, 2021.

FIELD

The present disclosure relates to a head-up display including a mirror which enables change of the angle inside the housing.

BACKGROUND

Patent Literature (PTL) 1 discloses a head-up display including a concave mirror (mirror) which reflects display light, the concave mirror being rotatably held by a bearing member (support member).

CITATION LIST

Patent Literature

PTL 1: Japanese Unexamined Patent Application Publication No. 2019-78966

SUMMARY

However, the head-up display according to above PTL 1 can be improved upon.

In view of this, the present disclosure provides a head-up display capable of improving upon the above related art.

The head-up display according to one aspect of the present disclosure includes a mirror including a mirror body and a shaft serving as a rotary axis; a bearing member which holds the shaft of the mirror to be rotatable; a torsion spring through which the shaft penetrates and which urges the mirror in a predetermined rotational direction of the rotary axis with respect to the bearing member; and a housing which accommodates the mirror, the bearing member, and the torsion spring. Here, the torsion spring is disposed on an opposite side opposite to the mirror with respect to the bearing member, the bearing member includes a protrusion which is protruded to the opposite side and to which one end of the torsion spring is hung, and the housing includes a depressed portion fitted to the bearing member to fix the bearing member.

The head-up display according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
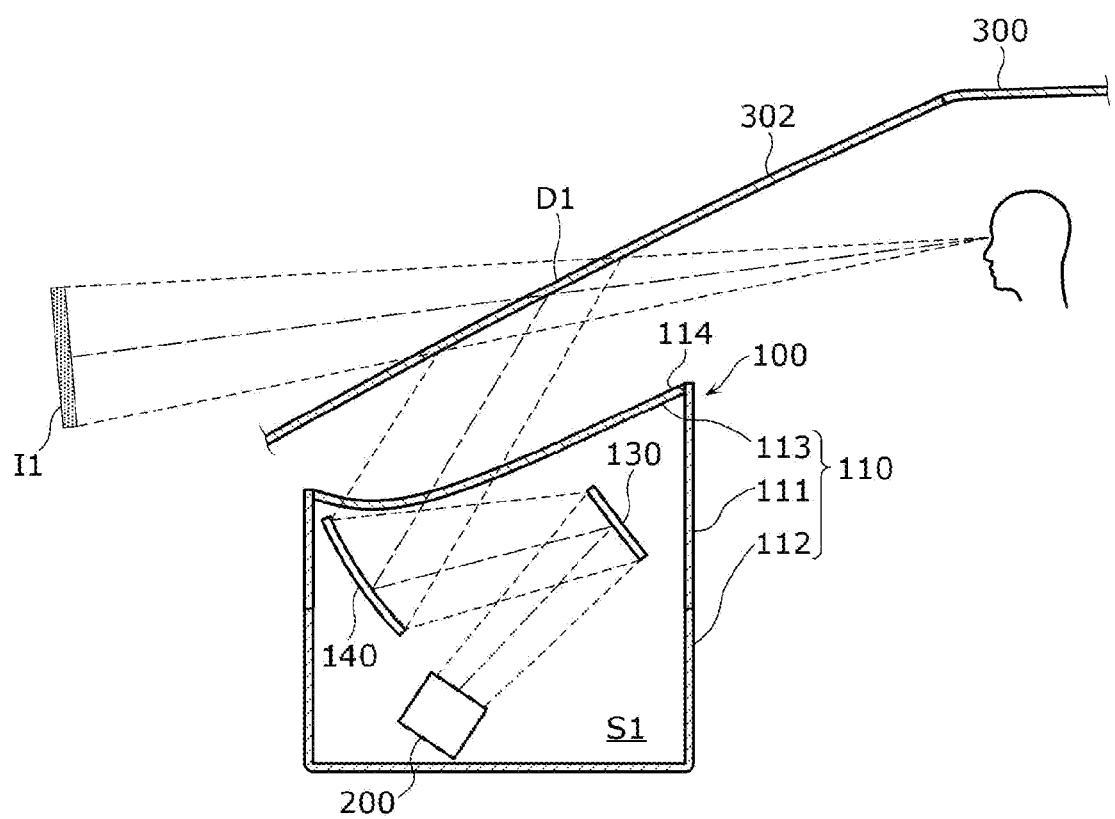
FIG. 1 is a diagram illustrating a usage example of the head-up display according to an embodiment.

DESCRIPTION OF EMBODIMENT (Underlying Knowledge Forming Basis of the Present Disclosure)

The present inventor has found that the head-up display described in "Background Art" has the following problem.

Because the head-up display disclosed in PTL 1 has a configuration in which the bearing member is fixed to the housing, a task to fix the mirror to the bearing member and then fix the bearing member to the housing needs to be executed. This may complicate the task to fix the bearing member to the housing.

From above, there has been a demand for a head-up display which can facilitate execution of the task to fix the mirror to the housing in the state where the mirror is rotatably held by the bearing member.

Thus, the head-up display according to one aspect of the present disclosure includes a mirror including a mirror body and a shaft serving as a rotary axis; a bearing member which holds the shaft of the mirror to be rotatable; a torsion spring through which the shaft penetrates and which urges the mirror in a predetermined rotational direction of the rotary axis with respect to the bearing member; and a housing which accommodates the mirror, the bearing member, and the torsion spring. Here, the torsion spring is disposed on an opposite side opposite to the mirror with respect to the bearing member, the bearing member includes a protrusion which is protruded to the opposite side and to which one end of the torsion spring is hung, and the housing includes a depressed portion fitted to the bearing member to fix the bearing member.

For this reason, by fitting the mirror in the state where the bearing member and the torsion spring are provided thereto, to the depressed portion of the housing, the worker can easily assemble the head-up display to the housing in the state where the mirror is rotatably held by the bearing member. In other words, the worker can easily perform a task to fix the mirror to housing 110 in the state where the mirror is rotatably held by the bearing member.

Moreover, a height of the protrusion may be greater than a width of the one end of the torsion spring.

For this reason, the one end of the torsion spring can be kept hung to the protrusion, reducing coming off of the one end of the torsion spring from the protrusion.

Moreover, the bearing member may further include a flat plate part protruded to exceed the height of the protrusion.

For this reason, the rigidity of the bearing member can be enhanced, improving the durability of the bearing member.

Moreover, the protrusion may be disposed in a direction of extension of the flat plate part, and the bearing member may include a concavity disposed between the protrusion and the flat plate part.

For this reason, the one end of the torsion spring can be accommodated in the concavity in the state where no urging force in the rotational direction generates in the torsion spring.

Moreover, a portion from the concavity to the protrusion may be oblique to an axial direction of the shaft.

For this reason, the one end of the torsion spring can be prevented from being caught on the concavity side by the protrusion when the worker who performs the assembling task moves the one end of the torsion spring from the concavity to hang the one end to the protrusion opposite to the concavity, and thus the worker can smoothly move the one end.

Moreover, the depressed portion of the housing may be in tight contact with the bearing member.

Thereby, the gap between the bearing member and the depressed portion of the housing can be 0, reducing vibration of the mirror and thus display shape of the video.

Moreover, the bearing member may be fixed to the depressed portion by fitting a portion of the bearing member excluding the flat plate part to the depressed portion.

For this reason, the portion of the bearing member excluding the flat plate part can be fixed to the depressed portion.

Moreover, the depressed portion may include a first portion defining a first space to which the bearing member is fitted; and a second portion defining a second space which is disposed under the first space and is smaller than the first space.

Moreover, the housing may include a first member and a second member which defines a space of the housing with the first member, and the flat plate part of the bearing member may be sandwiched by the first member and the second member.

Because the flat plate part is sandwiched by the first member and the second member as above, the bearing member is more securely fixed to the housing.

Moreover, the bearing member may be fixed to the depressed portion by further fixing the flat plate part to the housing by a fastening member which penetrates through the flat plate part.

Because the flat plate part is fixed to the housing in the state where the fastening member penetrates through the flat plate part as above, the bearing member is more securely fixed to the housing.

Moreover, the head-up display may further include a drive unit which generates power to rotate the mirror. Here, the mirror may include a gear member for transmitting the power from the drive unit to the shaft.

Because the gear member can be separately attached to the mirror as above, the gear member can be easily applied to mirrors having other shapes or housings having other shapes.

Moreover, the head-up display may further include a switch which transits to an ON state when pressed. Here, the gear member may include a protrusion which presses the switch when the mirror is in a posture at a start of rotation.

For this reason, it can be detected that the mirror is in the first posture, because the switch is in the ON state.

Moreover, the torsion spring may further have a function as a compression spring, and the head-up display may further include a restricting member which is fixed to an end of the shaft, and restricts extension of the torsion spring in a state where the restricting member sandwiches and compresses the torsion spring with the bearing member.

Because the restricting member restricts the torsion spring in a compressed state as above, the position of the mirror in the direction of the rotary axis can be restricted. Because the position of the mirror in the direction of the rotary axis can be restricted by urging in the direction of the rotary axis by the torsion spring, when the head-up display vibrates, transmission of an impact, which is caused by the vibration, from the housing to the shaft of the mirror can be reduced.

Hereinafter, an embodiment will be specifically described with reference to the drawings. The embodiment described below is illustrative as one specific example of the present disclosure. Numeric values, shapes, materials, components, arrangement positions of components, connection forms thereof, steps, order of steps, and the like shown in the embodiment below are exemplary, and should not be construed as limitations to the present disclosure. Moreover, among components according to the embodiment below, the components not described in an independent claim representing the most superordinate concept of the present disclosure are described as optional components.

Embodiment

1. Usage Example of Head-Up Display

Figure 2:
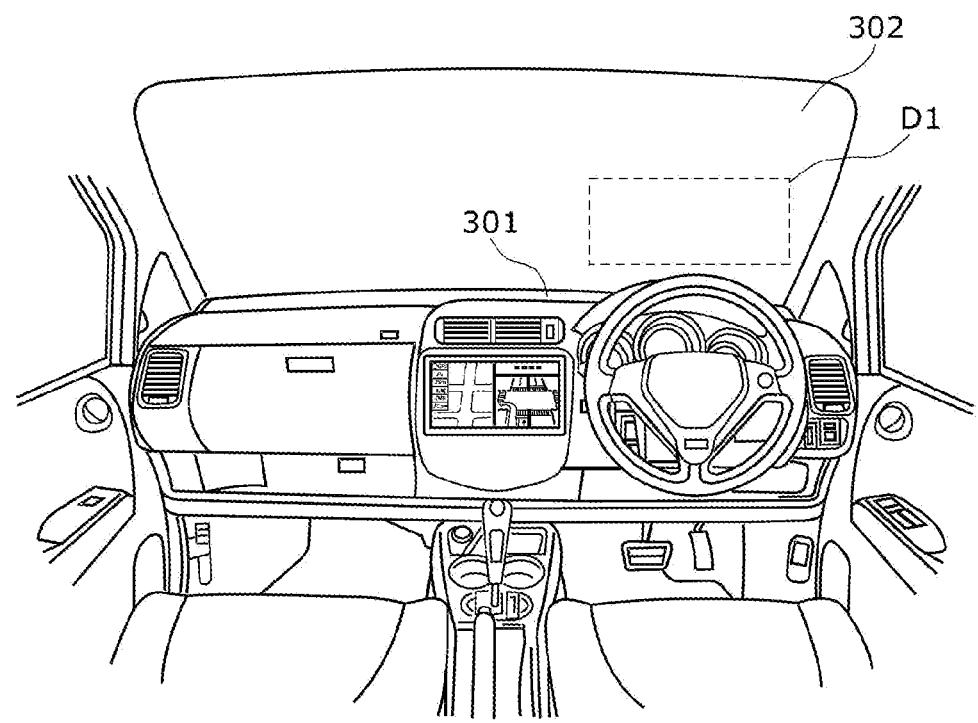
FIG. 2 is a diagram illustrating a region of an image displayed by the head-up display according to the embodiment.

Initially, with reference to FIGS. 1 and 2, a usage example and a schematic configuration of head-up display 100 according to the present embodiment will be described. FIG. 1 is a diagram illustrating an usage example of head-up display 100 according to the present embodiment. FIG. 2 is a diagram illustrating a display region of an image to be displayed by head-up display 100 according to the present embodiment.

Head-up display 100 according to the present embodiment is configured as an in-vehicle head-up display (HUD), and is attached in the vicinity of a top surface of dashboard 301 in vehicle 300.

Head-up display 100 projects light to region D1 of windshield (front window) 302 as a display medium. The projected light is reflected from windshield 302. This reflected light is directed to the eyes of a driver in a driver's seat who is a user of head-up display 100. The driver recognizes the reflected light entering the eyes as virtual image I1 seen on an opposite side with respect to windshield 302 (side external to the vehicle) against a background of objects which are actually present and seen across windshield 302. In the present embodiment, this series of situations is expressed as "head-up display 100 displays virtual image I1 using windshield 302".

FIG. 2 is a diagram illustrating one example of region D1 to which light is projected by head-up display 100 according to the present embodiment.

As illustrated in FIG. 2, for example, head-up display 100 attached to dashboard 301 projects light to region D1 located close to the driver's seat in a lower portion of windshield 302 (a region surrounded by the dashed line in the drawing). Thereby, virtual image I1 seen on the opposite side with respect to windshield 302 (side external to the vehicle) when seen from the driver in the driver's seat (with reference to FIG. 1) is displayed.

2. Configuration of Head-Up Display

Figure 3:
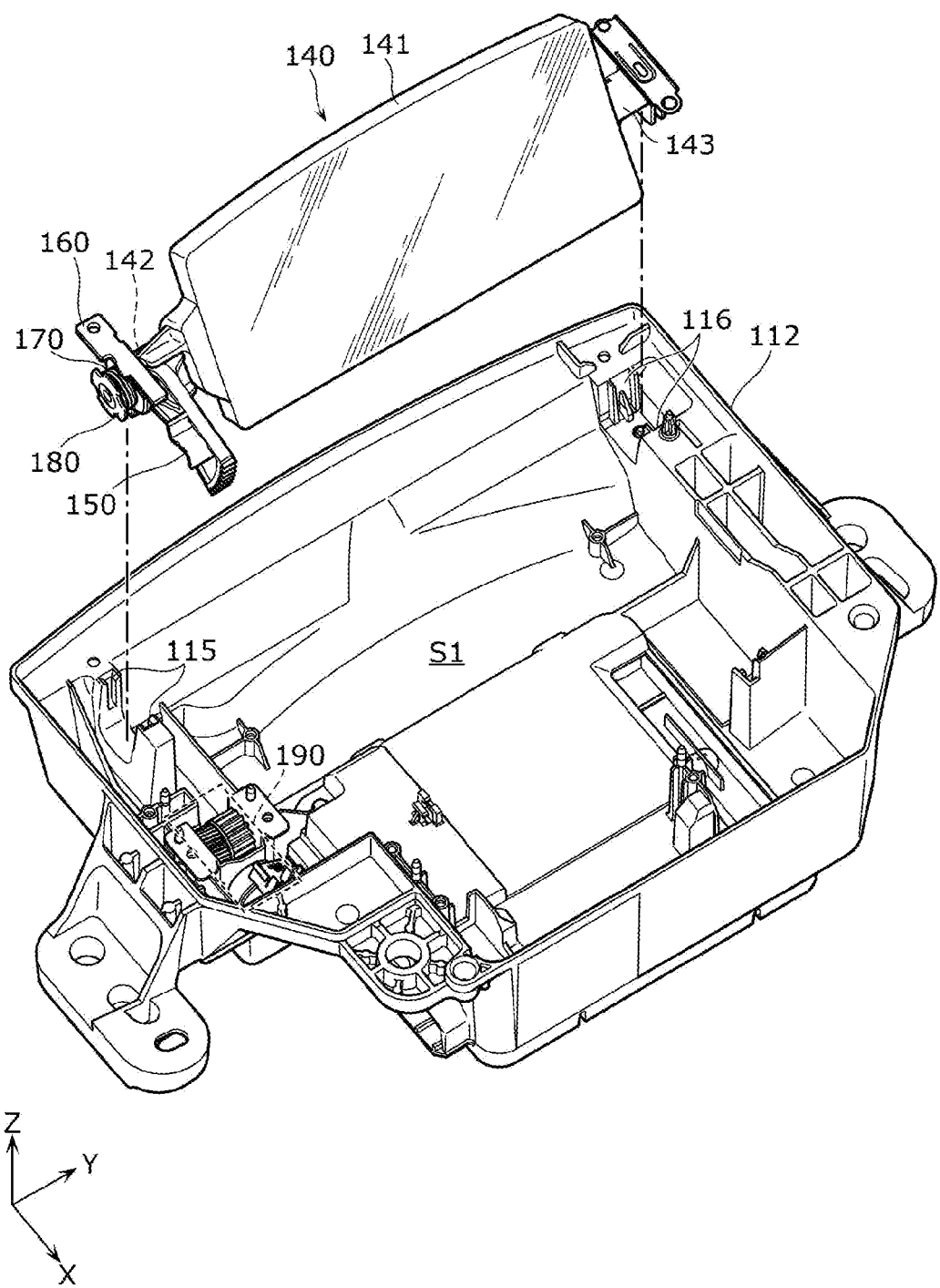
FIG. 3 is an exploded perspective view illustrating a housing of the head-up display according to the embodiment where its upper housing is removed.

Next, with reference to FIGS. 1 and 3, the configuration of head-up display 100 will be described. FIG. 3 is an exploded perspective view illustrating the housing of head-up display 100 according to the present embodiment where its upper housing is removed.

In FIG. 3 and thereafter, the vertical direction is referred to as Z-axial direction, a traveling direction of the vehicle vertical to the Z-axial direction is referred to as X-axial direction, and a direction vertical to the Z-axial direction and the X-axial direction (the left and right direction of the vehicle) is referred to the Y-axial direction.

As illustrated in FIG. 1, head-up display 100 includes housing 110, mirror 130, mirror 140, and liquid crystal module 200. As illustrated in FIG. 3, head-up display 100 includes a variety of components for connecting mirror 140 to housing 110, and drive unit 190.

Housing 110 includes upper housing 111 defining an upper portion of a box body having an approximately cuboidal shape elongated in the Y-axial direction and having opening 114 in its upper portion, lower housing 112 defining a lower portion of the box body, and transparent cover 113 which closes opening 114 of upper housing 111. Upper housing 111 and lower housing 112 together form space S1 of housing 110. Upper housing 111 is one example of the first member, and lower housing 112 is one example of the second member. Housing 110 accommodates mirror 130, mirror 140, and liquid crystal module 200. Housing 110 is configured of a resin, for example, and may be configured of a metal.

Mirror 130 is a mirror which reflects a video projected by liquid crystal module 200. Mirror 140 further reflects the video reflected from mirror 130, and projects the reflected video to the outside of head-up display 100 through opening 114. Specifically, the video reflected from mirror 140 is projected to windshield 302. Mirror 130 and mirror 140 in the present embodiment are rectangular plate-like members elongated in the Y-axial direction. Mirrors 130 and 140 are configured of a resin, a metal, or the like, for example.

Drive unit 190 generates power to rotate mirror 140. Specifically, drive unit 190 is a motor which gives power for changing the angle of mirror 140 to mirror 140, for example. The rotary axis of drive unit 190 and the rotary axis of mirror 140 are connected by a power transmission member. The power generated by drive unit 190 is transmitted to mirror 140 through the power transmission member. The power transmission member is a gear in the present embodiment. The power transmission member is not limited to a gear, and may be a belt.

Liquid crystal module 200 is one example of a video generator which projects a video by irradiating a liquid crystal panel with light from a light source. Although liquid crystal module 200 is configured to be entirely accommodated in housing 110 in the present embodiment, it may be configured such that part of liquid crystal module 200 is accommodated in housing 110, or may be configured to be disposed outside housing 110.

3. Configuration of Connection Portion of Mirror 140

Figure 4:
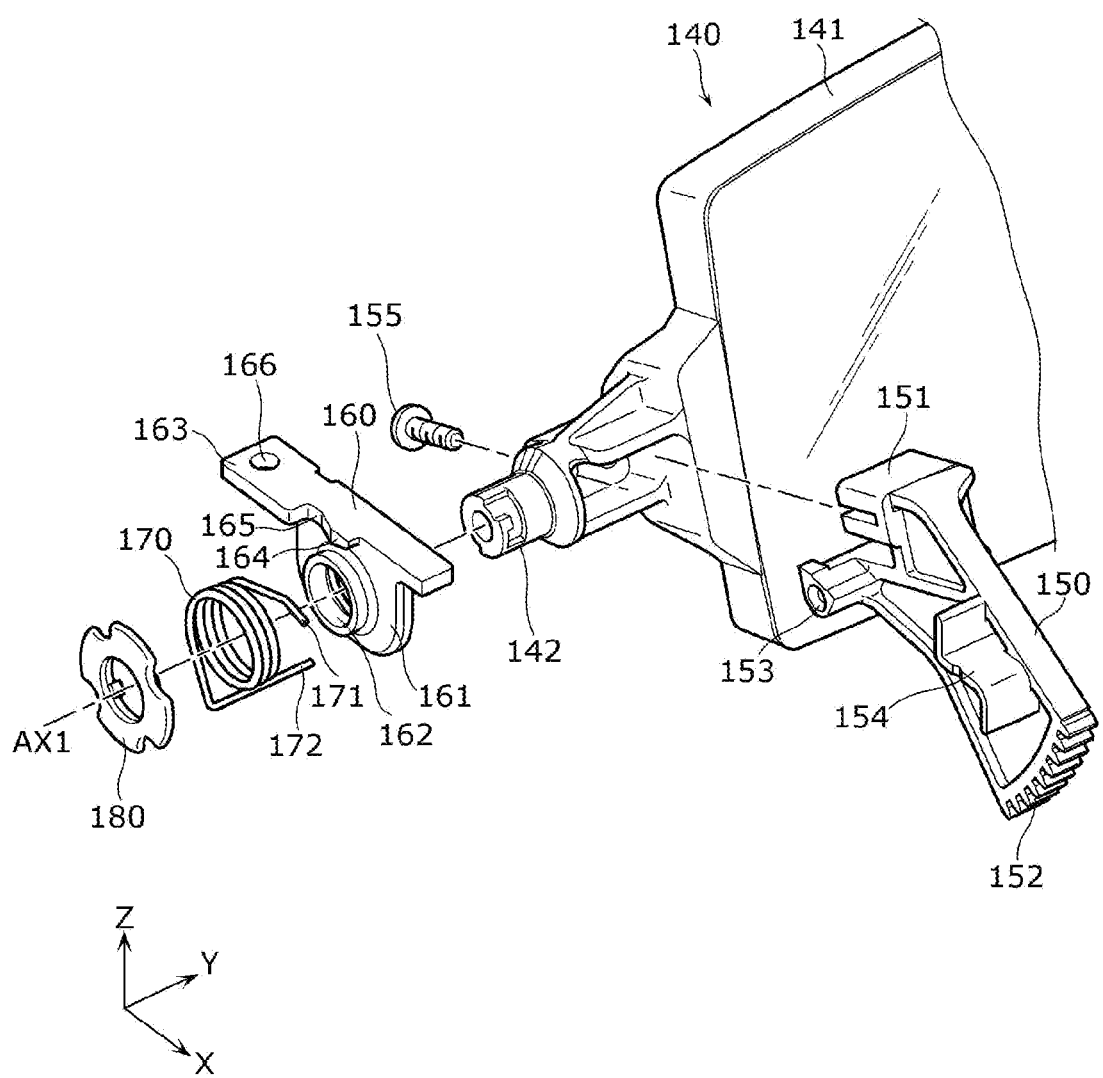
FIG. 4 is an exploded perspective view illustrating the connection portion of the mirror to the lower housing.

Next, the configuration of the connection portion of mirror 140 to lower housing 112 will be described with reference to FIGS. 3 and 4. FIG. 4 is an exploded perspective view illustrating the connection portion of mirror 140 to lower housing 112.

As illustrated in FIGS. 3 and 4, mirror 140 is rotationally held by rotary axis AX1 parallel to the Y-axial direction in holders 115 and 116 of lower housing 112.

Mirror 140 includes mirror body 141, and shafts 142 and 143 which define rotary axis AX1 of mirror body 141. Mirror body 141 is a rectangular plate-like member elongated in the Y-axial direction, and is a portion including a mirror on a surface thereof. Shaft 142 is a cylindrical portion protruded from an end face of mirror body 141 on the minus side in the Y-axial direction to the minus side in the Y-axial direction. Shaft 143 is a cylindrical portion protruded from an end face of mirror body 141 on the plus side in the Y-axial direction to the plus side in the Y-axial direction. Shaft 142 and shaft 143 are arranged on rotary axis AX, and are portions which hold mirror body 141 to be rotatable about rotary axis AX1.

Shaft 142 is held by holder 115 in lower housing 112, and shaft 143 is held by holder 116 in lower housing 112. Shaft 142 includes gear member 150, bearing member 160, torsion spring 170, and restricting member 180.

Gear member 150 is a member which is disposed to extend between shaft 142 and drive unit 190, and transmits the power from drive unit 190 to shaft 142. Gear member 150 includes fixing part 151 fixed to shaft 142, and gear part 152 which receives the power from drive unit 190. Gear member 150 is fixed to shaft 142 by fixing fastening member 155, which penetrates through shaft 142, to fixing part 151. Gear member 150 may further have hole 153 to which an end of torsion spring 170 is fixed. Gear member 150 may further have protrusion 154. The function of protrusion 154 will be described later.

Bearing member 160 is a member which holds shaft 142 of mirror 140 to be rotatable. Bearing member 160 includes bearing body 161 having through hole 162 through which shaft 142 penetrates, and flat plate part 163 parallel to rotary axis AX1. Through hole 162 may be surrounded by a cylindrical portion protruded from bearing body 161 to the minus side in the Y-axial direction. Flat plate part 163 is parallel to an X-Y plane, and is disposed in an upper end of bearing body 161. Flat plate part 163 is a rectangular plate-like portion elongated in the X-axial direction.

Moreover, bearing member 160 includes protrusion 164 protruded to the minus side in the Y-axial direction, that is, the side of bearing member 160 opposite to mirror body 141 of mirror 140. Protrusion 164 is a portion to which one end 171 of torsion spring 170 is hung. Protrusion 164 is disposed in a direction of extension of flat plate part 163, that is, in a direction in which an X-Y plane that is parallel to flat plate part 163 and passes through flat plate part 163 is present. Flat plate part 163 is protruded to the minus side in the Y-axial direction to exceed the height of protrusion 164. In other words, the protrusion amount of flat plate part 163 from bearing body 161 to the minus side in the Y-axial direction is greater than that of protrusion 164.

Moreover, bearing member 160 further includes concavity 165 disposed between flat plate part 163 and protrusion 164. Flat plate part 163 and protrusion 164 have portions protruded from bearing body 161 to the minus side in the Y-axial direction. In other words, concavity 165 is a portion having a smaller protrusion amount from bearing body 161 to the minus side in the Y-axial direction than those of flat plate part 163 and protrusion 164. Concavity 165 may be a portion whose protrusion amount from bearing body 161 to the minus side in the Y-axial direction is 0.

Flat plate part 163 includes through hole 166. The function of through hole 166 will be described later.

Torsion spring 170 is disposed on an opposite side opposite to mirror body 141 of mirror 140 with respect to bearing member 160, shaft 142 penetrating through torsion spring 170. One end 171 of torsion spring 170 is hung and fixed to protrusion 164, and other end 172 is fixed to hole 153 of gear member 150. When one end 171 and other end 172 approach in the circumferential direction of a circle around rotary axis AX1, torsion spring 170 generates a resilient force directed to recede one end 171 and other end 172 in the circumferential direction. In other words, torsion spring 170 generates an urging force in a rotational direction directed to recede gear member 150 and bearing member 160 in the rotational direction of rotary axis AX1.

Torsion spring 170 may further have a function as a compression spring. In other words, when the coiled portion through which shaft 142 penetrates is compressed in the Y-axial direction, torsion spring 170 generates a resilient force in an extension direction.

Restricting member 180 is fixed to the end of shaft 142 on the minus side in the Y-axial direction, and restricts extension of torsion spring 170 in a state where restricting member 180 sandwiches and compresses torsion spring 170 with bearing member 160. Restricting member 180 has a plate-like shape extending away from shaft 142 in a direction vertical to rotary axis AX1 of shaft 142. Restricting member 180 is disposed in a position in the Y-axial direction to overlap at least part of torsion spring 170.

Because restricting member 180 restricts torsion spring 170 to a compressed state as above, the position of mirror 140 in the direction of rotary axis AX1 can be restricted. Because the position of mirror 140 in the direction of rotary axis AX1 is restricted by urging in the direction of rotary axis AX1 by torsion spring 170, when head-up display 100 vibrates, transmission of an impact, which is caused by the vibration, from housing 110 to shaft 142 of mirror 140 can be reduced.

Here, a method of fixing torsion spring 170 will be described with reference to FIGS. 5 and 6.

Figure 5:
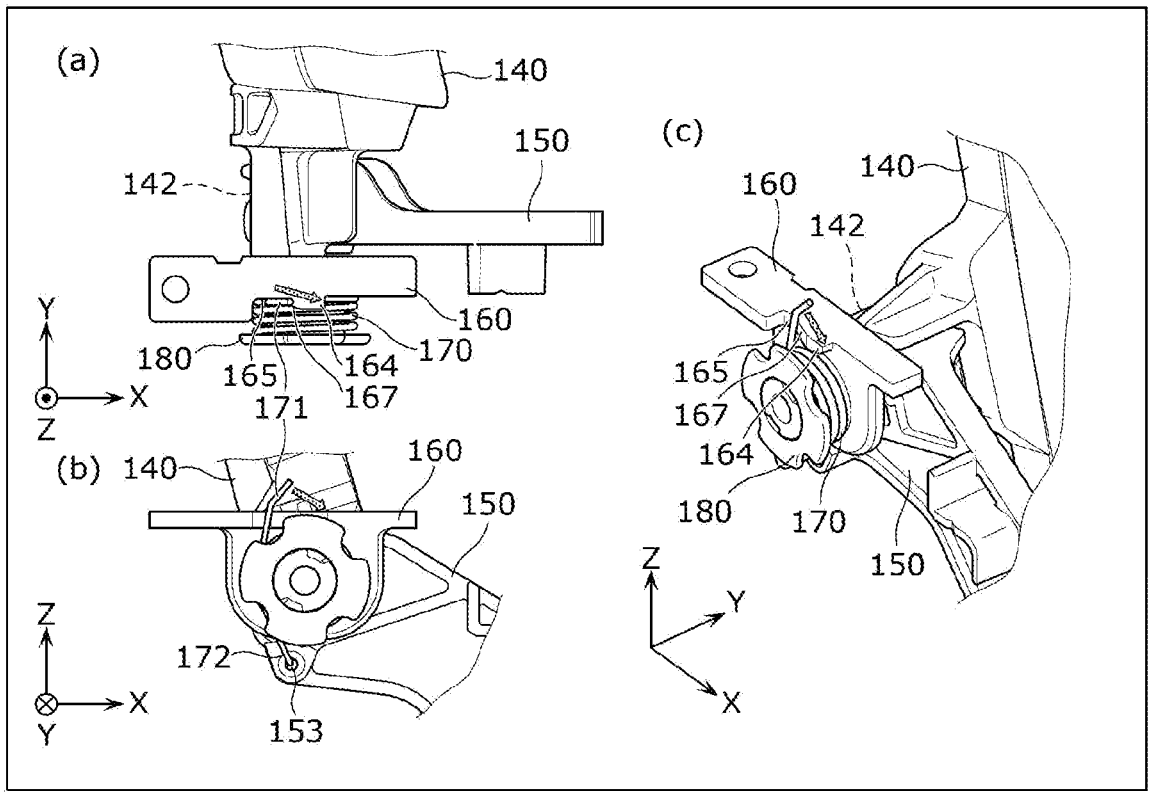
FIG. 5 is a top surface view, a lateral surface view, and a perspective view of the connection portion of the mirror to the lower housing.
Figure 6:
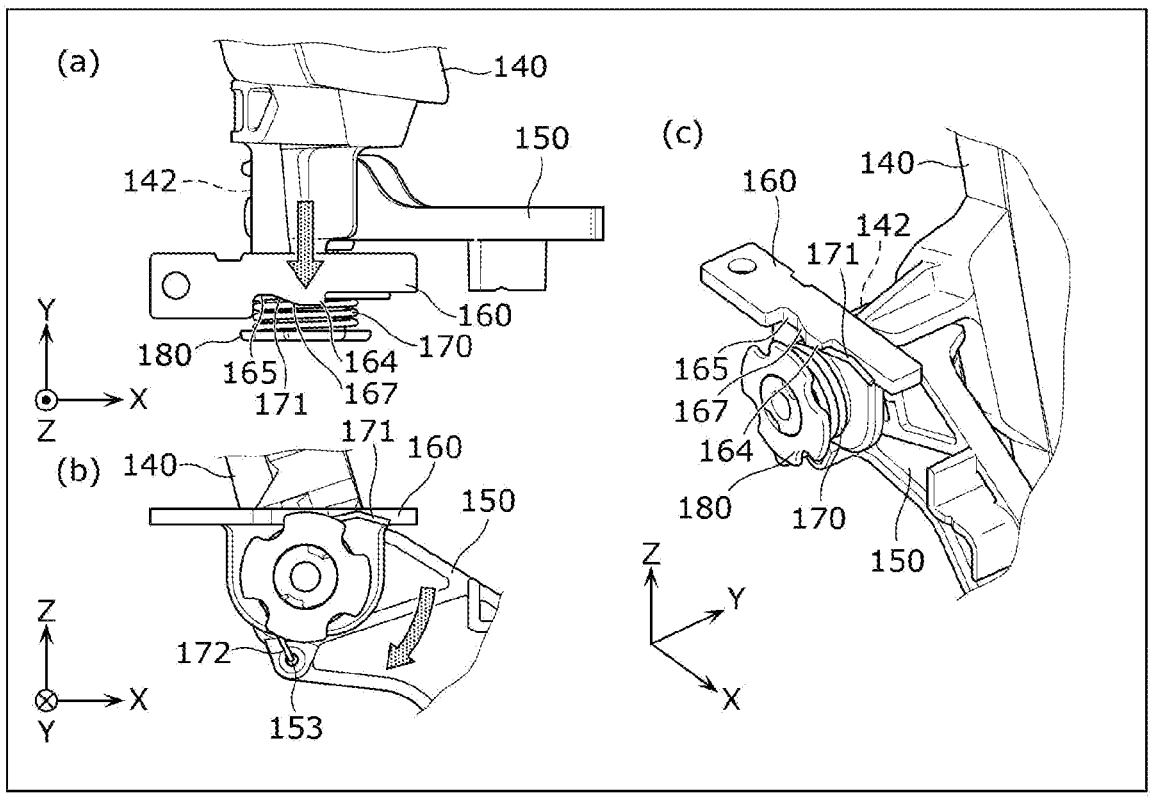
FIG. 6 is a top surface view, a lateral surface view, and a perspective view of the connection portion of the mirror to the lower housing.

FIGS. 5 and 6 are top surface views, lateral surface views, and perspective views of the connection portion of mirror 140 to lower housing 112. FIG. 5 shows a state before one end 171 of torsion spring 170 is hung to protrusion 164 of bearing member 160, and FIG. 6 shows a state after one end 171 is hung to protrusion 164. (a) of FIG. 5 and (a) of FIG. 6 are top surface views, (b) of FIG. 5 and (b) of FIG. 6 are lateral surface views, and (c) of FIG. 5 and (c) of FIG. 6 are perspective views.

As illustrated in FIG. 5, in the state where gear member 150, bearing member 160, torsion spring 170, and restricting member 180 are assembled to shaft 142, one end 171 of torsion spring 170 is placed in a position of concavity 165 of bearing member 160. In this state, one end 171 of torsion spring 170 is moved from the position of concavity 165 to the plus side of the X-axial direction of protrusion 164. As a result, as illustrated in FIG. 6, one end 171 of torsion spring 170 is hung and fixed to the position on the plus side of the X-axial direction of protrusion 164. In other words, one end 171 of torsion spring 170 and other end 172 thereof are fixed in a state where these approach in the circumferential direction around shaft 142. Thus, as illustrated in (b) of FIG. 6, torsion spring 170 urges gear member 150 in a rotational direction clockwise with respect to bearing member 160. Because gear member 150 is fixed to shaft 142 of mirror 140, torsion spring 170 urges mirror 140 in the rotational direction clockwise with respect to bearing member 160. For this reason, a worker can easily bring torsion spring 170 to the state where torsion spring 170 applies an urging force in the rotational direction between bearing member 160 and mirror 140, only by moving one end 171 of torsion spring 170 from concavity 165 to the plus side of the X-axial direction of protrusion 164 and hanging one end 171 to protrusion 164. Thus, working efficiency can be improved.

In bearing member 160, portion 167 from concavity 165 to protrusion 164 is oblique to axial direction AX1 of shaft 142. For this reason, one end 171 of torsion spring 170 can be prevented from being caught on the minus side in the X-axial direction by protrusion 164 when a worker who performs the assembling task moves one end 171 of torsion spring 170 from concavity 165 to the plus side of the X-axial direction of protrusion 164, and thus the worker can smoothly move one end 171.

In bearing member 160, the height of protrusion 164 (i.e., the protrusion amount of protrusion 164 from bearing body 161 to the minus side in the Y-axial direction) is greater than the width of one end 171 of torsion spring 170. Such a configuration can keep one end 171 of torsion spring 170 hung to protrusion 164, reducing detachment of one end 171 of torsion spring 170 from protrusion 164.

Next, the effect of the urging force acting between bearing member 160 and mirror 140 and gear member 150 by torsion spring 170 will be described with reference to FIGS. 7 and 8.

Figure 7:
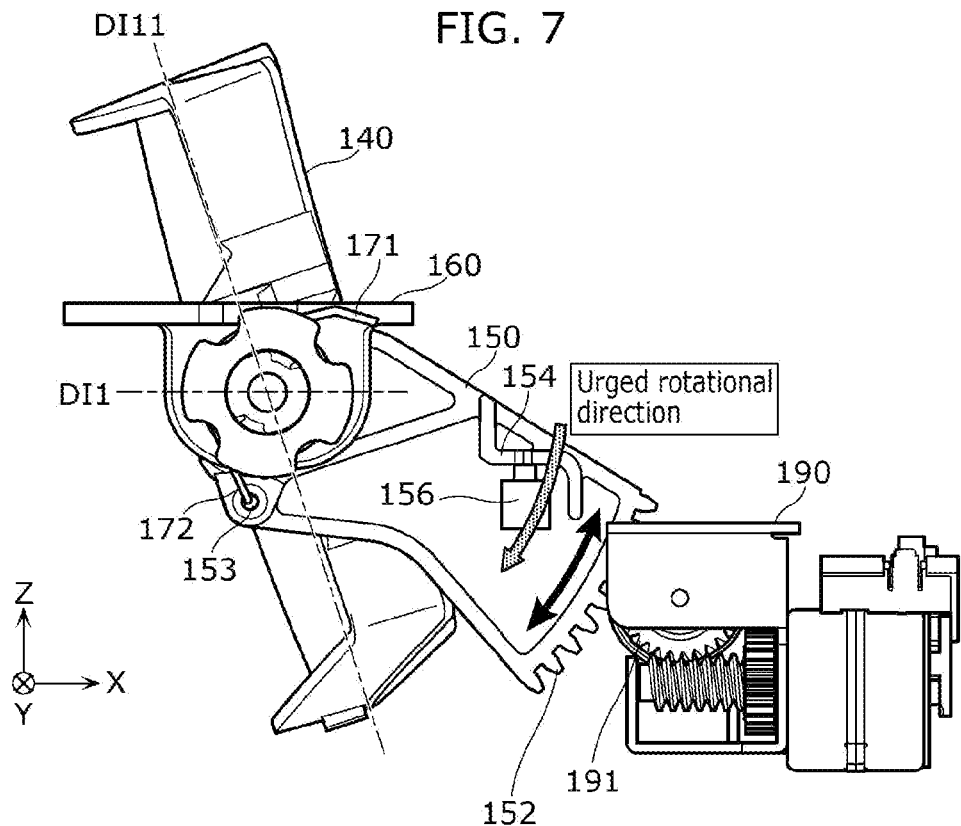
FIG. 7 is a side view illustrating a first posture in an initial state before the mirror rotates.

FIG. 7 is a side view illustrating a first posture in an initial state before mirror 140 rotates. FIG. 8 is a side view illustrating a second posture in a state after mirror 140 rotates to adjust the angle.

The first posture of mirror 140 in the initial state is a posture parallel to direction DI11 forming angle θ1 with horizontal direction DI1. The second posture of mirror 140 after the adjustment is a posture parallel to direction DI12 forming angle θ2 with horizontal direction DI1.

Figure 8:
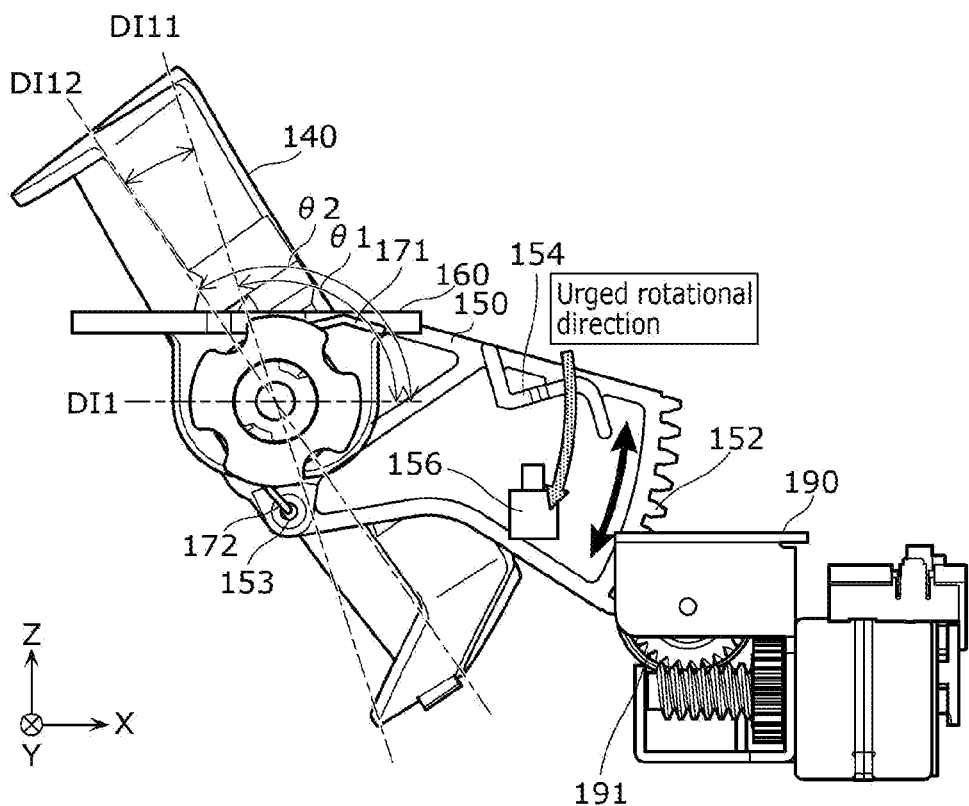
FIG. 8 is a side view illustrating a second posture in a state after the mirror rotates to adjust the angle.

Because bearing member 160 is fixed to lower housing 112, when an urging force from torsion spring 170 acts in the clockwise rotational direction illustrated in FIGS. 7 and 8, a state is maintained where the lateral surface (toothed surface) of gear part 152 of gear member 150 in the clockwise rotational direction is in contact with the lateral surface (toothed surface) of teeth of gear 191 in drive unit 190 in the counterclockwise rotational direction. Thus, the state where the toothed surface of gear part 152 is in contact with the toothed surface of gear 191 in drive unit 190 is maintained even when mirror 140 is in the first posture or in the second posture, and therefore unsteadiness of mirror 140 can be reduced.

The function of protrusion 154 of gear member 150 will be described with reference to FIGS. 7 and 8.

Figure 9:
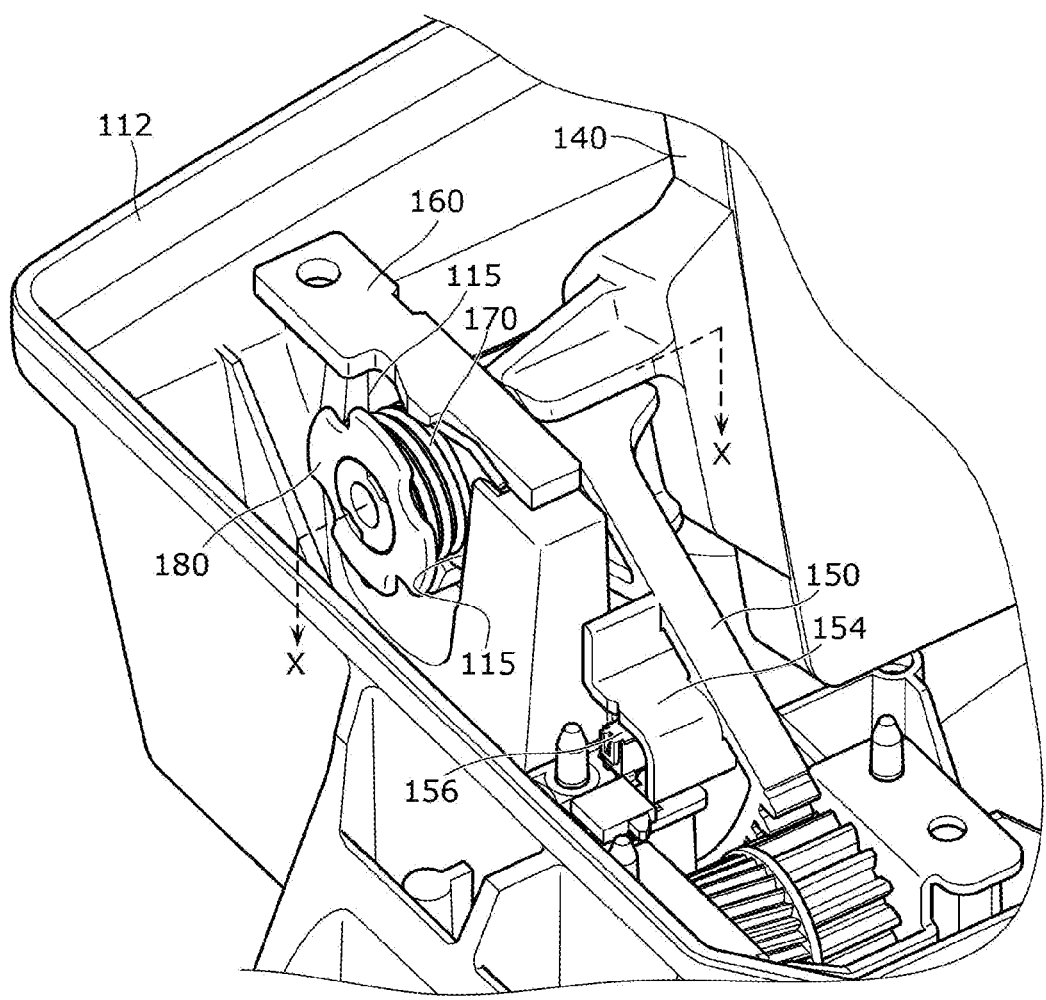
FIG. 9 is a perspective view of the bearing member and its surroundings, where the upper housing is removed.

As illustrated in FIG. 7, when mirror 140 is in the first posture in the initial state, protrusion 154 presses switch 156. For example, as illustrated in FIG. 9, switch 156 is fixed to lower housing 112. When pressed, switch 156 transits to the ON state; when the pressed state is released, switch 156 transits to the OFF state. Switch 156 is a tactile switch, for example. A controller not illustrated can determine that the posture of mirror 140 is in the first posture, for example, when switch 156 is in the ON state. As illustrated in FIG. 8, protrusion 154 is away from switch 156 when mirror 140 is in the second posture. For this reason, when switch 156 is in the OFF state, for example, the controller can determine that the posture of mirror 140 is not the first posture. Thus, the controller can easily determine that mirror 140 is in the first posture when switch 156 is in the ON state.

Figure 10:
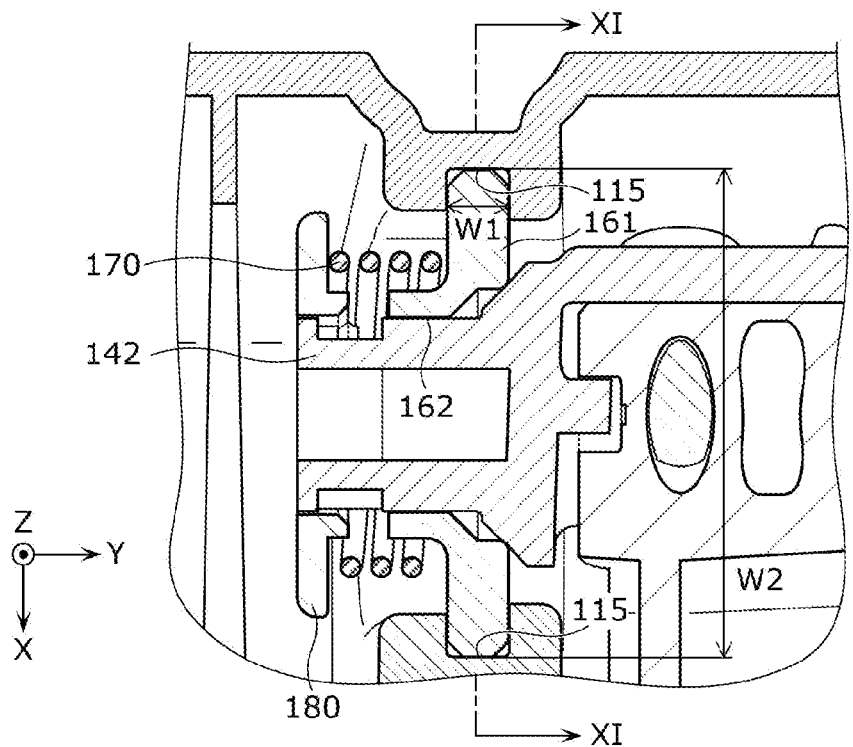
FIG. 10 is a cross-sectional view taken along X-X in FIG. 9.
Figure 11:
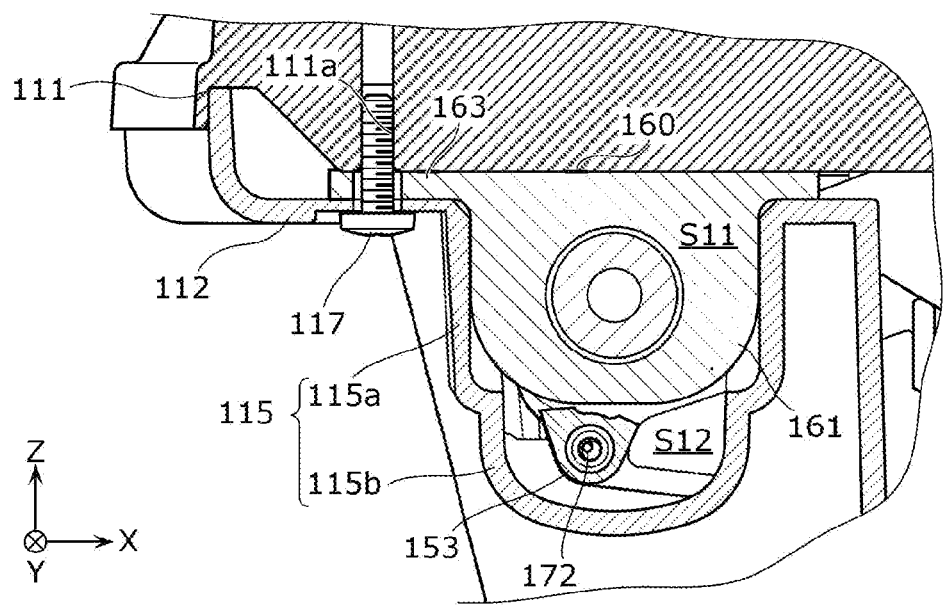
FIG. 11 is a cross-sectional view taken along XI-XI in FIG. 10.

Next, the connection form of bearing member 160 and lower housing 112 will be described with reference to FIGS. 9 to 11. FIG. 9 is a perspective view of bearing member 160 and its surroundings, where upper housing 111 is removed. FIG. 10 is a cross-sectional view taken along X-X in FIG. 9. Specifically, FIG. 10 is a cross-sectional view when head-up display 100 excluding upper housing 111 is cut along an X-Y plane through rotary axis AX1. FIG. 11 is a cross-sectional view taken along XI-XI in FIG. 10. Specifically, FIG. 11 is a cross-sectional view when bearing body 161 of bearing member 160 is cut along an X-Z plane passing through the center of bearing body 161 in the Y-axial direction.

As illustrated by these drawings, holder 115 is configured of a depressed portion (groove) fitted to bearing body 161 of bearing member 160, i.e., a portion of bearing member 160 excluding flat plate part 163. The depressed portion as holder 115 is fitted to bearing body 161 to fix bearing member 160 to lower housing 112. The depressed portion as holder 115 is in tight contact with bearing body 161 of bearing member 160. Specifically, the width of the depressed portion as holder 115 in the Y-axial direction and that of bearing body 161 in the Y-axial direction are width W1, and are equal. The width of the depressed portion as holder 115 in the X-axial direction and that of bearing body 161 in the X-axial direction are width W2, and are equal. Bearing body 161 may be press fitted into depressed portion of holder 115, or the clearance with the depressed portion as holder 115 may be 0. Thereby, the gap between bearing member 160 and holder 115 in lower housing 112 can be 0, reducing vibration of mirror 140 and thus display shake of the video.

As illustrated in FIG. 11, holder 115 includes first portion 115a defining first space S11 to which bearing body 161 of bearing member 160 is fitted, and second portion 115b defining second space S12 which is disposed under first space S11 and is smaller than first space S11. The width of second space S12 in the X-axial direction is smaller than that first space S11 in the X-axial direction. Second space S12 is a space which other end 172 of torsion spring 170 and hole 153 of gear member 150 can enter. Second space S12 is formed in a region in which the angle of mirror 140 is changed and hole 153 of gear member 150 and other end 172 of torsion spring 170 are moved. Because the width of second space S12 in the X-axial direction is smaller than that of the first space, a wall can be disposed from the outer wall of lower housing 112 on the minus side in the X-axial direction to second space S12, thus improving rigidity of lower housing 112.

Bearing member 160 is fixed to housing 110 by sandwiching flat plate part 163 between upper housing 111 and lower housing 112. Bearing member 160 is fixed to the depressed portion of holder 115 by fixing flat plate part 163 to housing 110 by fastening member 117 which penetrates through flat plate part 163. Fastening member 117 penetrates through through hole 166 of flat plate part 163. Fastening member 117 is a screw, for example.

Thus, bearing member 160 can be more securely fixed to housing 110 because flat plate part 163 is sandwiched by upper housing 111 and lower housing 112. Moreover, bearing member 160 can be more securely fixed to housing 110 because flat plate part 163 is fixed to housing 110 in the state where fastening member 117 penetrates through flat plate part 163.

Fastening member 117 penetrates through lower housing 112 and flat plate part 163 of bearing member 160 in a position located outside housing 110 and close to the outer wall of housing 110, and is fixed to hole 111a of upper housing 111.

4. Effects

Head-up display 100 according to the present embodiment includes mirror 140, bearing member 160, torsion spring 170, and housing 110. Mirror 140 includes mirror body 141, and shaft 142 serving as rotary axis AX1. Bearing member 160 holds shaft 142 of mirror 140 to be rotatable. Torsion spring 170 urges mirror 140 in a predetermined rotational direction of rotary axis AX1 with respect to bearing member 160, shaft 142 penetrating through torsion spring 170. Housing 110 accommodates mirror 140, bearing member 160, and torsion spring 170. Torsion spring 170 is disposed on an opposite side opposite to mirror 140 with respect to bearing member 160. Bearing member 160 includes protrusion 164 which is protruded to the opposite side opposite to mirror 140 with respect to bearing member 160 and to which one end 171 of torsion spring 170 is hung. Housing 110 includes a depressed portion (holder 115) fitted to bearing member 160 to fix bearing member 160.

For this reason, by fitting mirror 140 in the state where bearing member 160 and torsion spring 170 are provided thereto, to the depressed portion of holder 115 in housing 110, the worker who assembles head-up display 100 can easily assemble mirror 140 to housing 110 in the state where mirror 140 is rotatably held by bearing member 160. In other words, the worker can easily perform a task to fix mirror 140 to housing 110 in the state where mirror 140 is rotatably held by bearing member 160.

Moreover, in head-up display 100, a height of protrusion 164 is greater than a width of the one end of torsion spring 170. For this reason, one end 171 of torsion spring 170 can be kept hung to protrusion 164, reducing coming off of one end 171 of torsion spring 170 from protrusion 164.

Moreover, in head-up display 100, bearing member 160 further includes flat plate part 163 protruded to exceed the height of protrusion 164. For this reason, the rigidity of bearing member 160 can be enhanced, improving the durability of bearing member 160.

Moreover, in head-up display 100, protrusion 164 is disposed in a direction of extension of flat plate part 163. Bearing member 160 includes concavity 165 disposed between protrusion 164 and flat plate part 163. For this reason, one end 171 of torsion spring 170 can be accommodated in concavity 165 in the state where no urging force in the rotational direction generates in torsion spring 170.

Moreover, in head-up display 100, portion 167 from concavity 165 to protrusion 164 is oblique to axial direction AX1 of shaft 142. For this reason, one end 171 of torsion spring 170 can be prevented from being caught on the minus side in the X-axial direction by protrusion 164 when the worker who performs the assembling task moves one end 171 of torsion spring 170 from concavity 165 to the plus side of the X-axial direction of protrusion 164, and thus the worker can smoothly move one end 171.

Moreover, in head-up display 100, the depressed portion of holder 115 in housing 110 is in tight contact with bearing member 160. Thereby, the gap between bearing member 160 and holder 115 in lower housing 112 can be 0, reducing vibration of mirror 140 and thus display shake of the video.

Moreover, in head-up display 100, bearing member 160 is fixed to the depressed portion by fitting a portion of bearing member 160 excluding flat plate part 163 to the depressed portion of holder 115. For this reason, bearing body 161 of bearing member 160 can be fixed to the depressed portion.

Moreover, in head-up display 100, the depressed portion of holder 115 includes first portion 115a defining first space S11 to which bearing member 160 is fitted, and second portion 115b defining second space S12 which is disposed under first space S11 and is smaller than first space S1.

Moreover, in head-up display 100, housing 110 includes upper housing 111, and lower housing 112 which defines space S1 of housing 110 with upper housing 111. Flat plate part 163 of bearing member 160 is sandwiched by upper housing 111 and lower housing 112. Because flat plate part 163 is sandwiched by upper housing 111 and lower housing 112 as above, bearing member 160 is more securely fixed to housing 110.

Moreover, in head-up display 100, bearing member 160 is fixed to the depressed portion of holder 115 by further fixing flat plate part 163 to housing 110 by fastening member 117 which penetrates through flat plate part 163. Because flat plate part 163 is fixed to housing 110 in the state where fastening member 117 penetrates through flat plate part 163 as above, bearing member 160 is more securely fixed to housing 110.

Moreover, head-up display 100 further includes drive unit 190 which generates power to rotate mirror 140. Mirror 140 includes gear member 150 for transmitting the power from drive unit 190 to shaft 142. Because gear member 150 can be separately attached to mirror 140 as above, gear member 150 can be easily applied to mirrors having other shapes or housings having other shapes.

Moreover, head-up display 100 further includes switch 156 which transits to an ON state when pressed. Gear member 150 includes protrusion 154 which presses switch 156 when mirror 140 is in a posture at a start of rotation, that is, in the first posture. For this reason, the controller can easily determine that the mirror is in the first posture when switch 156 is in the ON state.

Moreover, in head-up display 100, torsion spring 170 further has a function as a compression spring. Head-up display 100 further includes restricting member 180. Restricting member 180 is fixed to an end of shaft 142, and restricts extension of torsion spring 170 in a state where restricting member 180 sandwiches and compresses torsion spring 170 with bearing member 160. Because restricting member 180 restricts torsion spring 170 in a compressed state as above, the position of mirror 140 in the direction of rotary axis AX1 can be restricted. Because the position of mirror 140 in the direction of rotary axis AX1 can be restricted by urging in the direction of rotary axis AX1 by torsion spring 170, when head-up display 100 vibrates, transmission of an impact, which is caused by the vibration, from housing 110 to shaft 142 of mirror 140 can be reduced.

5. Modification

Figure 12:
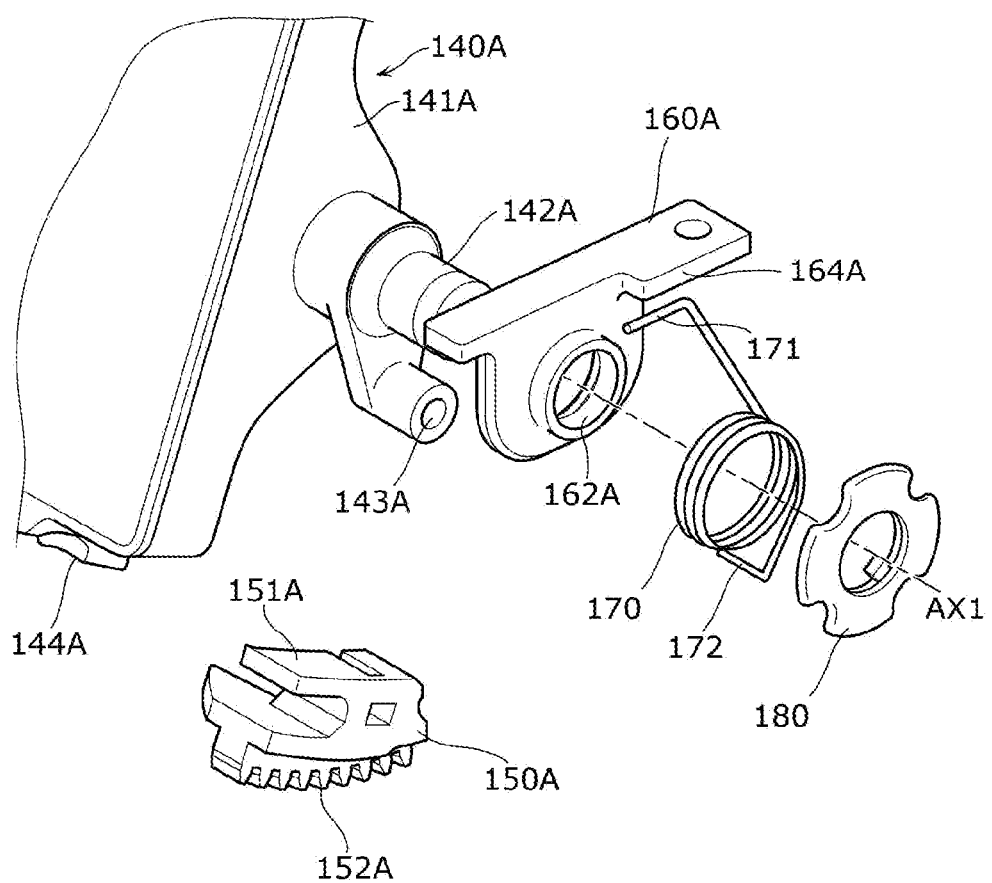
FIG. 12 is an exploded perspective view illustrating the connection portion of the mirror to the lower housing according to a modification.
Figure 13:
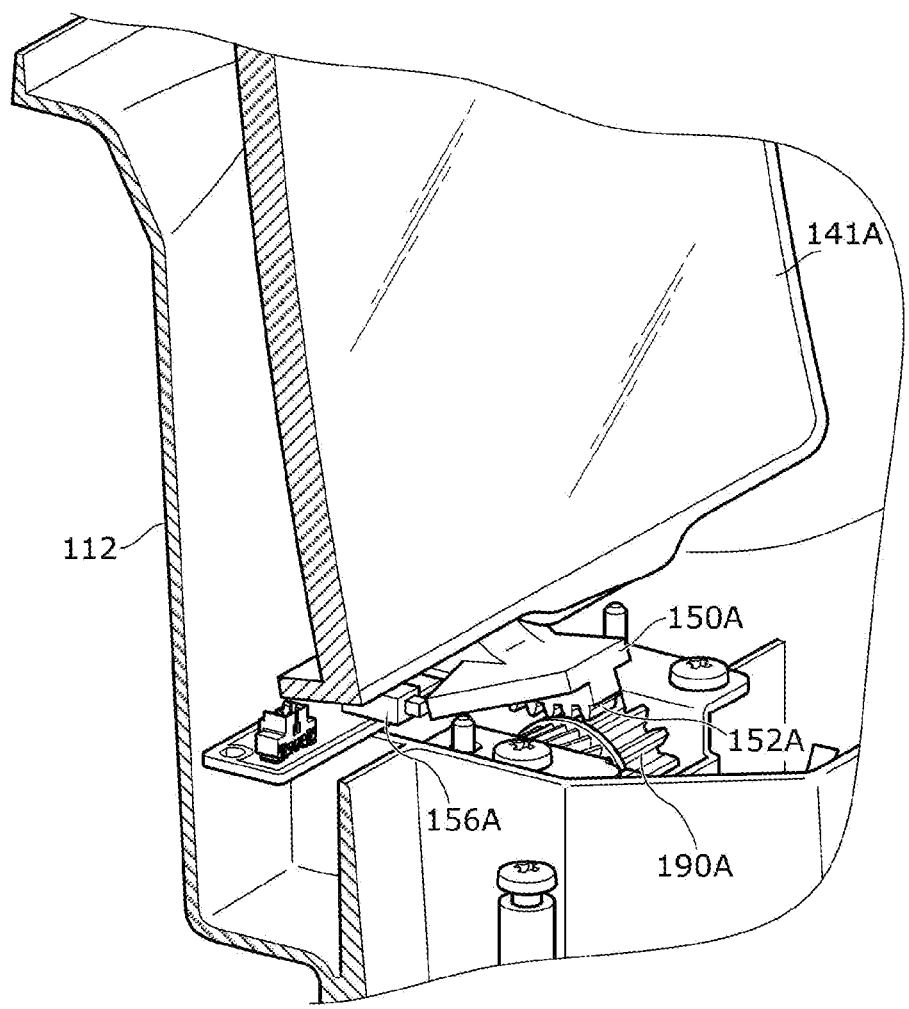
FIG. 13 is an enlarged perspective view of the connection portion of the mirror according to the modification.

Although in the embodiment above, mirror 140 is configured to receive the power from drive unit 190 with gear member 150 attached to shaft 142, any other configuration can be used. For example, as illustrated in FIGS. 12 and 13, gear member 150A may be disposed under mirror 140A. FIG. 12 is an exploded perspective view illustrating the connection portion of mirror 140A to the housing according to a modification. FIG. 13 is an enlarged perspective view of the connection portion of mirror 140A according to the modification.

As illustrated in these drawings, mirror 140A includes mirror body 141A, shaft 142A, hole 143A, and attachment 144A. Mirror body 141A is identical to mirror body 141. Shaft 142A is a cylindrical portion outwardly protruded in the longitudinal direction from the outside of an end face of mirror body 141A in the longitudinal direction. As in the embodiment, bearing member 160A, torsion spring 170, and restricting member 180 are attached to shaft 142A.

One end 171 of torsion spring 170 is hung to protrusion 164A of bearing member 160A, and other end 172 is fixed to hole 143A disposed in mirror body 141A. Restricting member 180 is fixed to an end of shaft 142A in the state where shaft 142A penetrates through bearing member 160A and torsion spring 170.

Gear member 150A includes fixing part 151A fitted to attachment 144A, and gear part 152A. Fixing part 151A is fitted to and fixed to attachment 144A. Gear part 152A receives power from drive unit 190A. Moreover, as illustrated in FIG. 13, gear member 150A presses switch 156A when mirror 140A is in the first posture in the initial state. For this reason, as in the embodiment, it can be easily detected that mirror 140A is in the first posture.

Thus, gear member 150A can implement the same function as that in the embodiment even when gear member 150A is disposed under mirror 140A.

Although the head-up displays according to one or a plurality of aspects of the present disclosure have been described based on the embodiment, the embodiment should not be construed as limitations to the present disclosure. The one or a plurality of aspects of the present disclosure may also cover a variety of modifications of the present embodiment made by persons skilled in the art, and embodiments configured with a combination of components included in different embodiments without departing from the gist of the present disclosure.

Further Information about Technical Background to this Application

The disclosure of the following patent application including specification, drawings, and claims are incorporated herein by reference in their entirety: Japanese Patent Application No. 2021-170418 filed on Oct. 18, 2021.

INDUSTRIAL APPLICABILITY

The present disclosure is useful as a head-up display or the like which can facilitate execution of a task to fix the mirror to the housing in the state where the mirror is rotatably held by the bearing member.

The invention claimed is:
1. A head-up display comprising:
a mirror including:
  a mirror body; and
  a shaft serving as a rotary axis;
a bearing member which holds the shaft of the mirror to be rotatable;
a torsion spring through which the shaft penetrates and which urges the mirror in a predetermined rotational direction of the rotary axis with respect to the bearing member; and
a housing which accommodates the mirror, the bearing member, and the torsion spring, wherein
the torsion spring is disposed on an opposite side opposite to the mirror with respect to the bearing member,
the bearing member includes:
  a protrusion which is protruded to the opposite side and to which one end of the torsion spring is hung,
  a flat plate part parallel to a direction intersecting an axial direction, and a bearing body parallel to the direction intersecting the axial direction and the direction in which the flat plate extends, and the housing includes a depressed portion fitted to the bearing member to fix the bearing member, wherein the depressed portion is in tight contact with a side of the bearing body.

2. The head-up display according to claim 1, wherein a height of the protrusion is greater than a width of the one end of the torsion spring.

3. The head-up display according to claim 1, wherein the flat plate part is protruded to exceed the height of the protrusion.

4. The head-up display according to claim 3, wherein the protrusion is disposed in a direction of extension of the flat plate part, and the bearing member includes a concavity disposed between the protrusion and the flat plate part.

5. The head-up display according to claim 4, wherein a portion from the concavity to the protrusion is oblique to an axial direction of the shaft.

6. The head-up display according to claim 3, wherein the bearing member is fixed to the depressed portion by fitting a portion of the bearing member excluding the flat plate part to the depressed portion.

7. The head-up display according to claim 3, wherein the housing includes:

a first member; and a second member which defines a space of the housing with the first member, and the flat plate part of the bearing member is sandwiched by the first member and the second member.

8. The head-up display according to claim 7, wherein the bearing member is fixed to the depressed portion by further fixing the flat plate part to the housing by a fastening member which penetrates through the flat plate part.

9. The head-up display according to claim 1, wherein the depressed portion includes:

a first portion defining a first space to which the bearing member is fitted; and a second portion defining a second space which is disposed under the first space and is smaller than the first space.

10. The head-up display according to claim 9, wherein the second space is smaller than the bearing body.

11. The head-up display according to claim 1, further comprising:

a drive unit which generates power to rotate the mirror, wherein the mirror includes a gear member for transmitting the power from the drive unit to the shaft.

12. The head-up display according to claim 11, further comprising:

a switch which transits to an ON state when pressed, wherein the gear member includes a protrusion which presses the switch when the mirror is in a posture at a start of rotation.

13. The head-up display according to claim 1, wherein the torsion spring further has a function as a compression spring, and the head-up display further comprises a restricting member which is fixed to an end of the shaft, and restricts extension of the torsion spring in a state where the restricting member sandwiches and compresses the torsion spring with the bearing member.

* * * * *